Jan. 3, 1956     L. D. KAY     2,729,461
FIFTH WHEEL CONSTRUCTION
Filed July 27, 1953     2 Sheets-Sheet 1
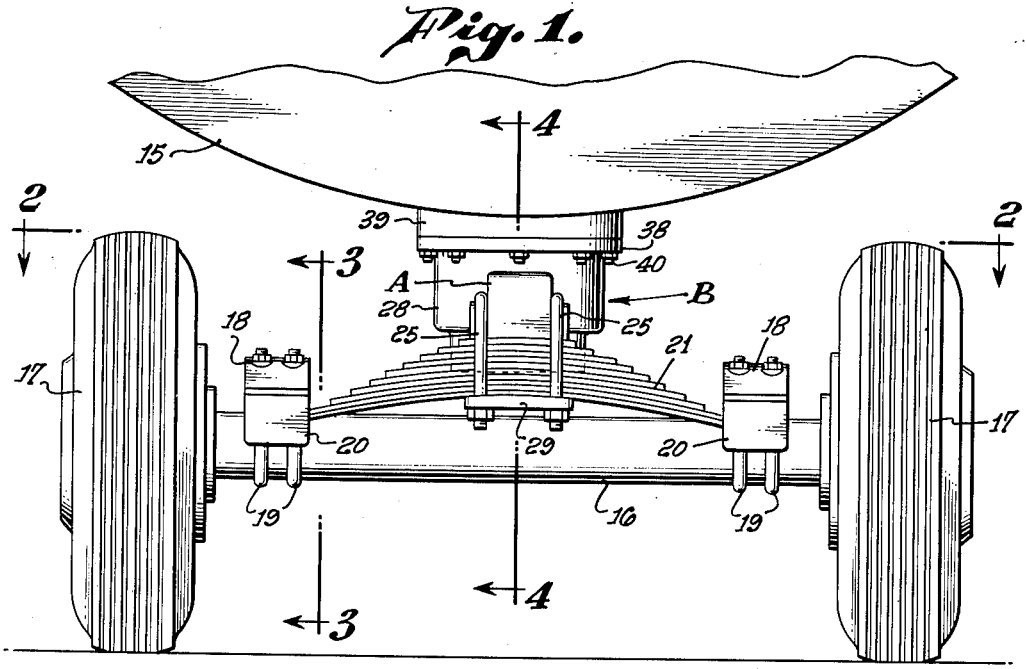
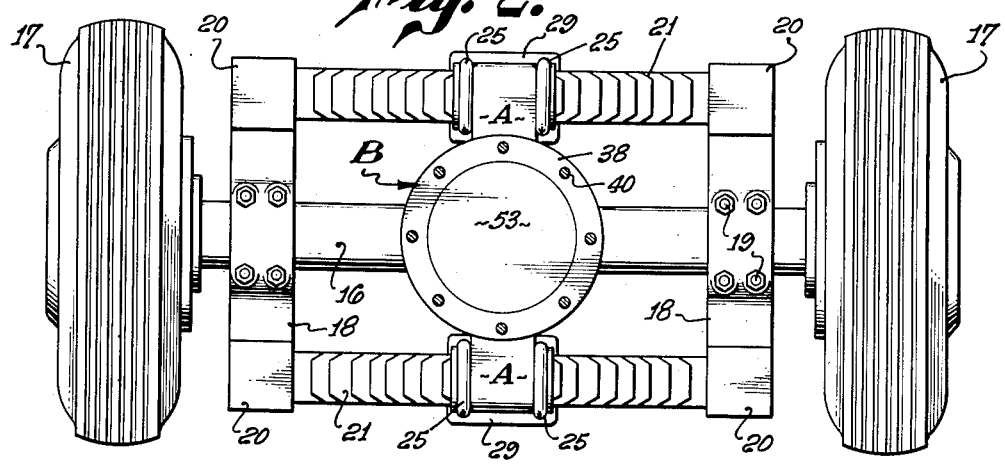
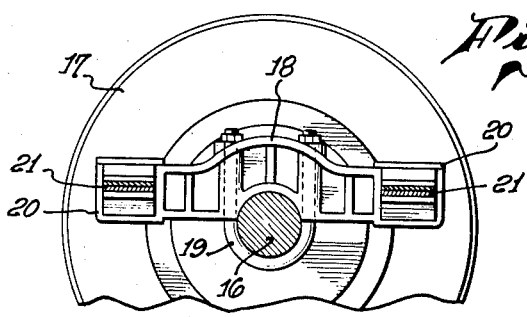
INVENTOR.
LLOYD D. KAY,
BY
ATTORNEY.

Jan. 3, 1956
L. D. KAY
2,729,461
FIFTH WHEEL CONSTRUCTION
Filed July 27, 1953
2 Sheets-Sheet 2
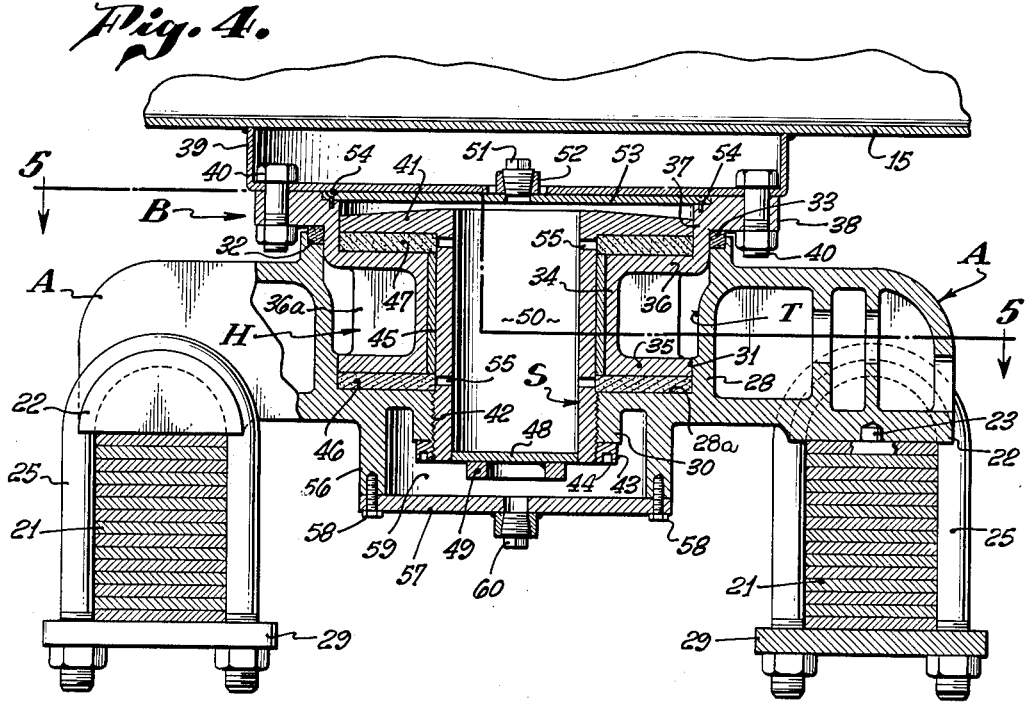
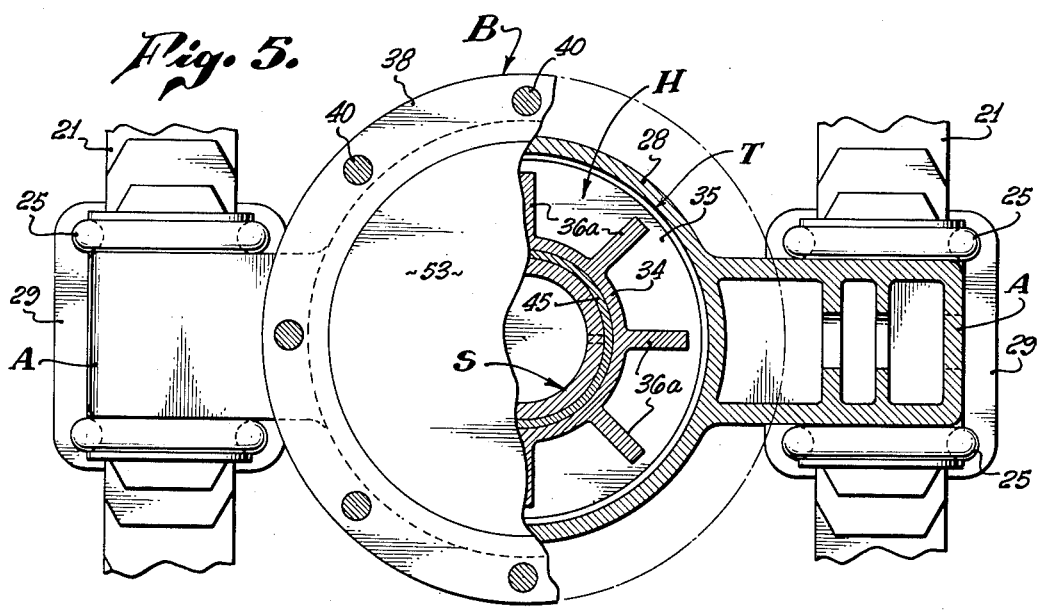
INVENTOR.
LLOYD D. KAY,
BY
ATTORNEY.

United States Patent Office 2,729,461
Patented Jan. 3, 1956

2,729,461

FIFTH WHEEL CONSTRUCTION

Lloyd D. Kay, San Marino, Calif., assignor to Kay-Brunner Steel Products, Inc., a corporation of Delaware Application July 27, 1953, Serial No. 370,470

9 Claims. (Cl. 280—125)

My invention relates to fifth wheel construction for trucks and trailers, and it has for a purpose the provision of a fifth wheel construction which is characterized by the structure and association of its parts to provide a fifth wheel having a low center of gravity; large bearing surfaces between the parts to successfully resist both axial and lateral thrusts, and thus hold such parts to rotate relatively about a vertical axis; a spindle providing an oil reservoir for constant and thorough lubrication of the bearing surfaces to minimize friction and wear; and a quick and readily accessible means for effecting an initial adjustment of the spindle axially to insure free rotation thereof without axial play, and subsequently to take up axial play produced as a result of wear of the spindle and related parts after long usage.

I will describe only one form of fifth wheel construction embodying my invention in association with a trailer, and will then point out the novel features thereof in claims.

In the accompanying drawings:

Fig. 1 is a front elevational view of a trailer of the tank-type, having applied thereto one form of fifth wheel construction embodying my invention.

Fig. 2 is a horizontal view taken on the line 2—2 of Fig. 1.

Fig. 3 is a vertical sectional view taken on the line 3—3 of Fig. 1.

Fig. 4 is an enlarged vertical sectional view taken on the line 4—4 of Fig. 1.

Fig. 5 is a sectional view taken on the line 5—5 of Fig. 4.

Referring in detail to the drawings, the front end is shown in Fig. 1 of a trailer having as a part of its frame a circular tank 15, a front axle 16 supported at its ends on wheels 17, with a pair of side frames 18 secured transversely to the axle by U-bolts 19, and housings 20 at their ends in which the ends of a pair of transverse leaf springs 21 are mounted in spaced parallelism to the axle.

The fifth wheel construction of my invention comprises a bolster generally indicated at B, and which is cast as a unitary structure to provide a stocket T and a pair of preferably hollow arms A extending radially from the socket. The outer ends of the arms have feet 22 recessed to receive pins 23 projecting upwardly from the crests of the springs 21. At their outer ends the arms A are formed on opposite sides with rounded and grooved shoulders to receive U-bolts 25, and these bolts are provided with plates 29 at the under sides of the springs 21 for securing the arms to the springs so that the bolster as a whole is fixedly supported by and transversely of the springs.

The socket T is made up of an annulus 28, and a flat bottom wall 28a constituting a bearing surface and provided with a central opening from the wall of which depends an inner collar 30. The lower portion of the annulus 28 is thickened to provide a vertical and annular bearing surface 31, while at its upper edge it is constructed to form an annular and shouldered seat 32 for an oil sealing rings 33.

A hub H is rotatably received in the socket T and is a unitary structure having the general form of a spool, and comprising a tubular portion 34 having on its lower end an annular flange 35, and on its upper end an annular flange 36. The flanges are reenforced by webs 36a which extended radially from the tubular portion 34 and vertically between the flanges as shown in Figs. 4 and 5.

At the outer edge of the flange 36 the hub is extended vertically upward to form a bearing collar 37, and from this collar the hub is extended horizontally to provide a flange 38. The hub H is adapted to be fixedly secured to a frame 39 welded to the underside of the tank 15, and by extending bolts 40 through the frame and the flange 38, as illustrated.

The hub as received in the socket has the outer edge of the lower flange 35 contacting with the bearing surface 31, and the outer side of the collar 37 bearing against the upper edge of the annulus 28 so that the ring 33 serves to seal the joint between the two to prevent the escape of oil.

Rotatably received in the tubular portion 34 of the hub H is a tubular spindle S the upper end of which is formed with an annular head 41 flat on its lower side and slightly rounded on its upper side, and of an outside diameter such as to have a rotating fit within the collar 37.

The spindle is of such length that its lower end projects downwardly beneath the collar 30, and it is secured to the bolster B for rotation therewith by a screw threaded connection 42 between the spindle and the collar 30. This connection 42 additionally provides an adjustment of the spindle vertically on the bolster as will be more fully described hereinafter, and it is capable of being locked in any adjusted position by means of a lock nut 43 having recesses 44 therein to receive a spanner wrench for securing the nut in abutting relation to the lower edge of the collar 30.

To minimize wear between the surfaces of the socket T, the hub H, and the spindle S, a metal bushing 45 is interposed between the spindle and the tubular portion 34, while a thrust washer 46 is interposed between the lower flange 35 and the bearing surface 29, and an upper thrust washer 47 interposed between the upper flange 36 and the head 41. These are washers preferably constructed of a canvas composition material.

The lower end of the spindle S is permanently closed by a disk 48 welded therein and provided on its lower side with a nut 49 to which a wrench can be applied for turning the spindle to effect axial adjustment thereof. The interior of the spindle provides a reservoir 50 for oil to lubricate the contacting surfaces of the socket, hub, and spindle to minimize friction and lessen wear of these parts. The reservoir is adapted to be filled with oil by removing a screw plug 51 from a collar 52 fixed on a cover plate 53 positioned between the frame 39 and the collar 37 and secured in place by screws 54. Oil from the reservoir is free to flow to the washers 46 and 47 and to the bushing 45, through ports 55 provided in the spindle at points opposite the washers, and thus constant and thorough lubrication of the bearing surfaces of the hub, socket, and spindle is at all times provided.

To prevent dust and water entering the bearing surfaces between the parts of the structure as well as to trap any oil which might leak therefrom, the bolster is formed with a depending collar 56 which surrounds the collar 30, and to which a lower cover plate 57 is secured by screws 58, thus forming a pocket 59 in which the oil is received and from which it can be drained by removal of a screw plug 60.

With my construction of fifth wheel, the bolster B and spindle S at all times oscillate together about the vertical axis of the hub H as a center, since by virtue of the construction of these parts and the manner in which they are associated the spindle is held against axial and lateral movements in the hub as well as the hub shifting longitudinally or laterally in the socket.

In assembling the structure the screw-threaded connection 42 affords an axial adjustment of the spindle to lower the head 41 and elevate the bolster so that the washers 46 and 47 are simultaneously brought into such bearing relation to the hub flanges 35 and 36 as to insure free rotative movement of the spindle in the hub yet preventing any axial play of the spindle. This axial adjustment of the spindle provides the added advantage of taking up any wear occuring as a result of long usage of the structure to restore a proper bearing relationship of the spindle and bolster in relation to the hub to eliminate axial and lateral play of any of these parts.

Manifestly, such adjustment is accomplished by applying a wrench to the nut 49 and turning the same, and once the required adjustment is effected the spindle can be locked by application of the lock nut 43.

The bearing surfaces provided by the head 41, the flanges 35 and 36, and the wall 29, are at all times adequately lubricated by the oil from the reservoir 50 not only to reduce friction and wear to a minimum but to insure free rotation or oscillation of the parts relatively. In point of fact the bearing surfaces of all parts of the structure turn in oil. Since such surfaces are of considerable area, adequate support for heavy loads is provided, and because they are flat as distinguished from tapered bearing surfaces, they cannot bind or lock under heavy loads.

Although I have herein shown and described only one form of fifth wheel construction embodying my invention, it is to be understood that various changes and modifications may be made herein without departing from the spirit of my invention and the spirit and scope of the appended claims.

What I claim is:

1. A fifth wheel construction, including: a hub of spool form adapted to be fixed to a vehicle frame so that its major axis is disposed vertically; a bolster having a socket rotatably receiving and supporting the hub; a spindle fixed to the bolster and extending upwardly through the hub, the spindle being tubular and closed at its lower end to provide therein a reservoir for oil; and ports in the spindle permitting oil from the reservoir to flow between the spindle and the hub and into the socket.

2. A fifth wheel construction, including: a hub of spool form adapted to be fixed to a vehicle frame so that its major axis is disposed vertically; a bolster having a socket rotatably receiving and supporting the hub; a spindle fixed to the bolster and extending upwardly through the hub; a head fixed on the upper end of the spindle and supported on the hub, the spindle being tubular and closed at its lower end to provide therein a reservoir for oil; and ports in the spindle permitting oil from the reservoir to flow between the spindle and the hub and the head and the hub and into the socket.

3. A fifth wheel construction, including: a bolster having a socket therein; a hub having upper and lower flanges, and a member fixed to the upper flange and adapted to be secured to a vehicle frame; the hub rotatably fitted in the socket and supported on the bottom of the socket by the lower flange; a spindle fixed to the bolster and rotatably fitted in the hub; a head on the upper end of the spindle supported on the upper flange; the spindle closed at its lower end and tubular to provide a reservoir for oil; and ports in the spindle permitting oil from the reservoir to flow to the outside of the spindle.

4. A fifth wheel construction, including: a hub of spool form adapted to be fixed to a vehicle frame so that its major axis is disposed vertically; a bolster having a socket rotatably receiving and supporting the hub; a tubular spindle rotatable in and extending upwardly through the socket and hub; a screw-threaded connection between the spindle and the bolster affording axial adjustment of the spindle; a head on the upper end of the spindle overlying the upper end of the hub; a member closing the lower end of the spindle; a nut fixed to the member by which the spindle can be turned to effect axial adjustment thereof; washers at the ends of the hub; and ports in the spindle providing communication between the interior of the spindle and the hub and socket.

5. A fifth wheel construction, including: a hub of spool form adapted to be fixed to a vehicle frame so that its major axis is disposed vertically; a bolster having a socket rotatably receiving and supporting the hub; a tubular spindle rotatable in and extending upwardly through the socket and hub; a screw-threaded connection between the spindle and the bolster affording axial adjustment of the spindle; a head on the upper end of the spindle overlying the upper end of the hub; a member closing the lower end of the spindle so that the interior of the latter provides a reservoir for oil; a cover for the upper end of the spindle having an opening through which the reservoir can be filled with oil; and ports in the spindle allowing oil from the reservoir to pass to the ends of the hub.

6. A fifth wheel construction, including: a bolster having a socket therein; a hub of spool form rotatable in the socket; a spindle of tubular form rotatable in the hub and closed at its lower end to provide a reservoir for oil; a head on the upper end of the spindle supported on the hub; ports in the spindle allowing oil from the reservoir to flow between the hub and the spindle, between the head and the hub and between the hub and the socket; and a connection between the spindle and the bolster for securing the two to each other and affording axial adjustment of the spindle on the bolster.

7. A fifth wheel construction, including: a bolster having a socket therein; a hub of spool form rotatable in the socket; a spindle of tubular form rotatable in the hub and closed at its lower end; a head on the upper end of the spindle supported on the upper end of the hub; and a screw-threaded connection between the lower end of the spindle and the bottom of the bolster for securing the two to each other and affording axial adjustment of the spindle on the bolster to draw the head downwardly and the bolster upwardly into bearing engagement with the hub.

8. A fifth wheel construction, including: a hub; a bolster having a socket rotatably receiving and supporting the hub; a spindle of tubular form rotatably supported in the hub; a screw-threaded connection between the lower end of the spindle and the hub affording axial adjustment of the two relatively; a closure for the lower end of the spindle; and a nut fixed on the closure affording rotation of said connection.

9. A fifth wheel construction, including: a bolster having a socket therein provided at its bottom with an opening bounded by a collar; a hub rotatably fitted in the socket and supported on the bottom thereof; a tubular spindle rotatably fitted in the hub; a screw-threaded connection between the lower end of the spindle and said collar affording axial adjustment of the spindle in the collar; a head on the upper end of the spindle supported on the upper end of the hub; a closure for the lower end of the spindle; a second collar depending from the bottom of the socket and surrounding the first-named collar; and a cover plate secured to the second collar.

References Cited in the file of this patent

UNITED STATES PATENTS

| | | |
|---|---|---|
| 75,115 | Bennett | Mar. 3, 1868 |
| 270,265 | Treman | Jan. 9, 1883 |
| 2,508,610 | Kendall | May 23, 1950 |